United States Patent
Leigh et al.

(10) Patent No.: US 7,894,806 B2
(45) Date of Patent: Feb. 22, 2011

(54) SYSTEMS AND METHODS TO DIRECT A MOBILE COMMUNICATIONS DEVICE TO A PREFERRED TELECONFERENCE BRIDGE

(75) Inventors: Randolph J. Leigh, Monument, CO (US); Thomas Ray Miller, Colorado Springs, CO (US); David Guthrie, Atlanta, GA (US); J. Scott Tapp, Atlanta, GA (US)

(73) Assignee: American Teleconferencing Services, Ltd., Atlanta, GA (US)

( * ) Notice: Subject to any disclaimer, the term of this patent is extended or adjusted under 35 U.S.C. 154(b) by 1283 days.

(21) Appl. No.: 11/424,899

(22) Filed: Jun. 19, 2006

(65) Prior Publication Data
US 2007/0123239 A1 May 31, 2007

Related U.S. Application Data

(63) Continuation-in-part of application No. 11/273,163, filed on Nov. 14, 2005, now abandoned.

(51) Int. Cl.
*H04M 3/00* (2006.01)
*H04M 1/00* (2006.01)

(52) U.S. Cl. ............... 455/416; 455/575.6; 348/14.08; 370/261

(58) Field of Classification Search ............... 455/416, 455/575.6; 370/261; 348/14.08
See application file for complete search history.

(56) References Cited

U.S. PATENT DOCUMENTS

| | | | |
|---|---|---|---|
| 5,414,750 A * | 5/1995 | Bhagat et al. | 455/416 |
| 6,501,740 B1 * | 12/2002 | Sun et al. | 370/261 |
| 6,892,083 B2 * | 5/2005 | Shostak | 455/575.6 |
| 6,934,279 B1 | 8/2005 | Sollee et al. | |
| 6,967,672 B1 * | 11/2005 | Huber et al. | 348/14.08 |
| 2004/0034723 A1 | 2/2004 | Giroti | |
| 2004/0083368 A1 | 4/2004 | Gehrmann | |

FOREIGN PATENT DOCUMENTS

EP 1469663 A1 10/2004
WO 02/078308 A1 10/2002

* cited by examiner

*Primary Examiner*—William D Cumming
(74) *Attorney, Agent, or Firm*—Smith Frohwein Tempel Greenlee Blaha LLC

(57) ABSTRACT

A telecommunication system includes a processor, interfaces in communication with the public telephone network and a data network, respectively, and a memory. The memory comprises executable instructions that when executed by the processor direct the system to controllably permit access to a teleconference bridge in response to a communication from a mobile-communication device that includes information responsive to a previously communicated license key. Generally, the communication is in the form of a call from the user of the mobile-communication device. Upon receipt of the call, the telecommunication system confirms that the mobile-communication device communicates a pass code that was included in an encrypted form in the license key.

18 Claims, 10 Drawing Sheets

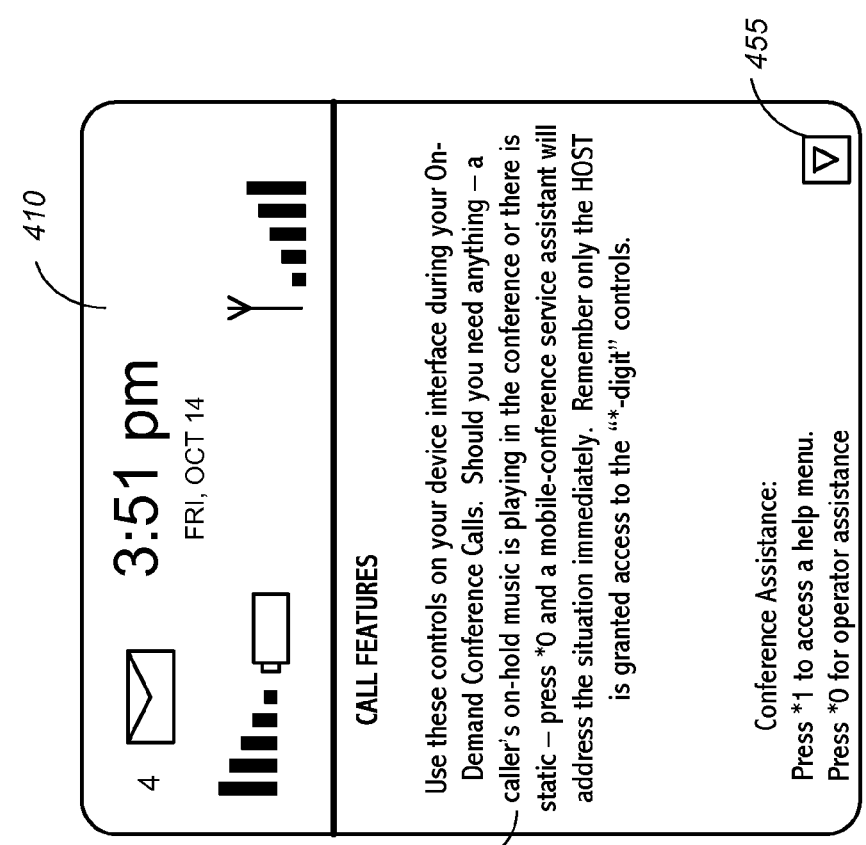
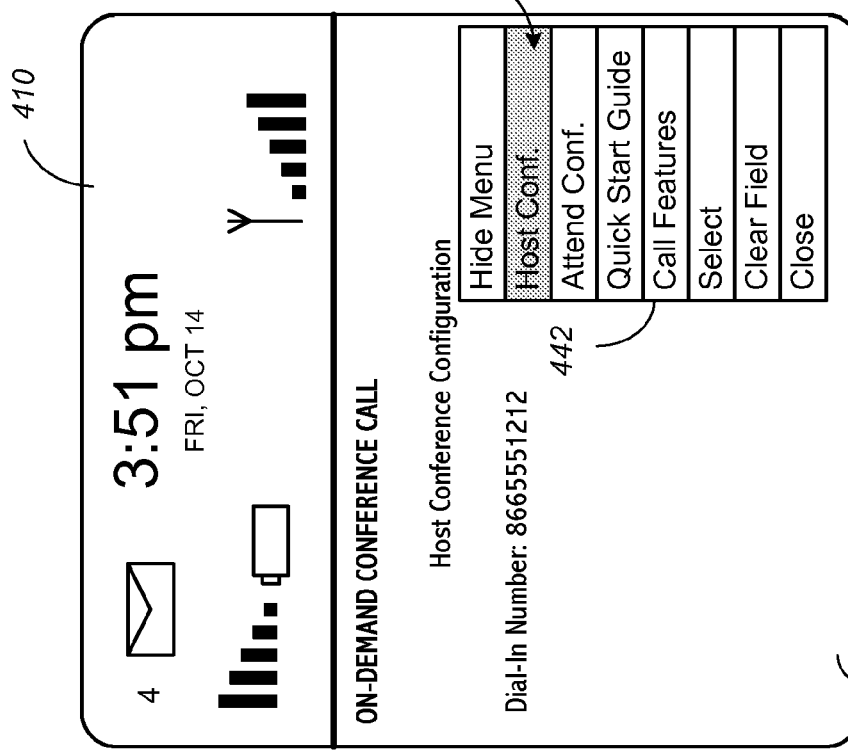
FIG. 4E
FIG. 4D

SYSTEMS AND METHODS TO DIRECT A MOBILE COMMUNICATIONS DEVICE TO A PREFERRED TELECONFERENCE BRIDGE

CROSS REFERENCE TO RELATED APPLICATION

This application is a continuation-in-part of U.S. patent application Ser. No. 11/273,163, entitled "Mobile-Device Directed Conference Calling," filed on Nov. 14, 2005 now abandoned, the entire disclosure of which is incorporated herein by reference.

BACKGROUND

Audio conferences via a switched telephone network are in widespread use. These conferences may be accomplished by use of a multi-line telephone or by a conference bridge having a telephone number that can be called by all conference participants. Typically, the teleconferencing service provider allocates one or more personal identification numbers (PINs) to subscribers and connects each subscriber to their intended conference based on the PIN entered by the subscriber, through equipment known as a teleconferencing bridge. A conference usually includes a host who organizes or leads the conference and a number of guests. The host may often have additional privileges beyond those of the guests, such as, for example, being able to add or remove guests from the conference. The conference host can be distinguished from the guests by having a PIN that is different from the PIN or PINs assigned to the guests.

Many telecommunications carriers and service providers offer conference call services whereby three or more callers may participate in the same call. To establish a conference call, a host typically arranges with a telecommunications carrier or other service provider to reserve a number of connections (i.e., ports) on a teleconference bridge, which combines (bridges) a plurality of telephone calls. The host may interact with an operator of the telecommunications carrier who, in turn, undertakes the necessary steps to reserve the required number of ports on a particular bridge. Alternatively, a host may reserve the requisite number of bridge ports by interacting with an automated system. Once the host has reserved the requisite number of ports on the bridge, each participant (including the host) enters the conference call by directly dialing a telephone number associated with the bridge to be connected to a bridge port. Upon receipt of a call, the bridge authenticates the caller by prompting the caller to enter an identifier in the form of an access code. Only when the caller enters the proper access code for the particular conference call does the bridge connect the caller with others who have already joined the conference call.

To enter the conference call, each participant must know both the telephone number of the bridge as well as the requisite access code. In practice, the host often receives a separate access code from the other participants to afford the host the ability to control various aspects of the call. Before a scheduled conference call, the host must communicate the bridge number and access code to each participant. For a large number of participants, ensuring that each scheduled participant receives the bridge number and participant code can prove cumbersome, particularly for participants at different locations. The problem of notifying all the conference participants of the conference bridge number and access code becomes even more pronounced for conference calls that occur on a frequent basis, such as every week or even every day. To alleviate this difficulty, some carriers allow the host to reserve the same bridge and use the same participant code. However, not all carriers afford every conference call host the ability to reserve the same bridge for every conference call.

To obviate the need to communicate the bridge number to every participant, some telecommunications carriers that provide conference call services will automatically launch a call to each participant at the start of the conference call. This approach works well for participants whose locations and telephone numbers are known in advance of the conference call. Unfortunately, telecommunications carriers that provide this type of conference call service may not know the location of every intended participant at the outset of the conference call. For example, the host and one or more invited participants may be away traveling, yet available to participate from a mobile telephone.

Many mobile telephone handsets provide a platform that supports multiple functions. These multiple functions include the receipt of games, ring tones, applications and multimedia content including music, video, broadcast programming, etc. for operation on the handset. The adaptability of these mobile telephone handsets makes it problematic for a service provider to ensure that application software provided to and executed on a particular mobile telephone handset is used to access an intended device configured to support a service.

Thus, there is a need for improved systems and methods that direct mobile-communication device applications to a desired device to ensure that providers of application software are compensated via subscriber use of a designated service device.

SUMMARY

An embodiment of a telecommunication system comprises a processor, a first interface in communication with a public-telephone network, a second interface in communication with a data network and a memory. The memory comprises executable instructions that when executed by the processor direct the system to direct the system to controllably permit access to a teleconference bridge in response to a communication from a mobile-communication device that includes information responsive to a communicated license key.

An embodiment of a method for directing a mobile-communication device initiated call to a designated teleconference bridge includes providing a telephone number and a license key to a subscriber of a mobile-communication service, providing executable instructions that upon initial execution on the mobile-communication device prompt an operator of the mobile-communication device to enter the license key and in response to the license key, decrypt and store the encrypted representation of a pass code included in the license key and upon receipt of a subsequent call from the mobile-communication device, waiting for receipt of the pass code before connecting the call to the teleconference bridge.

An embodiment of a mobile-communication device includes a processor, user and wireless interfaces and a memory. The user interface permits the entry of configuration information and voice and data to be communicated via the wireless interface of the mobile-communication device. The memory includes executable instructions that when executed by the processor direct the mobile-communication device to decrypt a license key entered via the user interface and communicate a decrypted translation of the license key to the teleconference bridge.

Other systems, methods, features and advantages will be or will become apparent to one with skill in the art upon examination of the following figures and detailed description. All such additional systems, methods, features and advantages are defined by the accompanying claims.

BRIEF DESCRIPTION OF THE FIGURES

The systems and methods to direct a mobile-communication device to a teleconference bridge can be better understood with reference to the following figures. The functions within the various figures are not necessarily performed in the order presented, emphasis instead being placed upon clearly illustrating the principles used to ensure that a user of application software on a mobile-communication device is directed to a designated device. Moreover, in the figures, like reference numerals designate corresponding parts throughout the different views.

FIGS. 4A through 4F are schematic diagrams illustrating alternative embodiments of a graphical-user interface on the mobile-communication device of FIG. 1.

DETAILED DESCRIPTION

Figure 1:
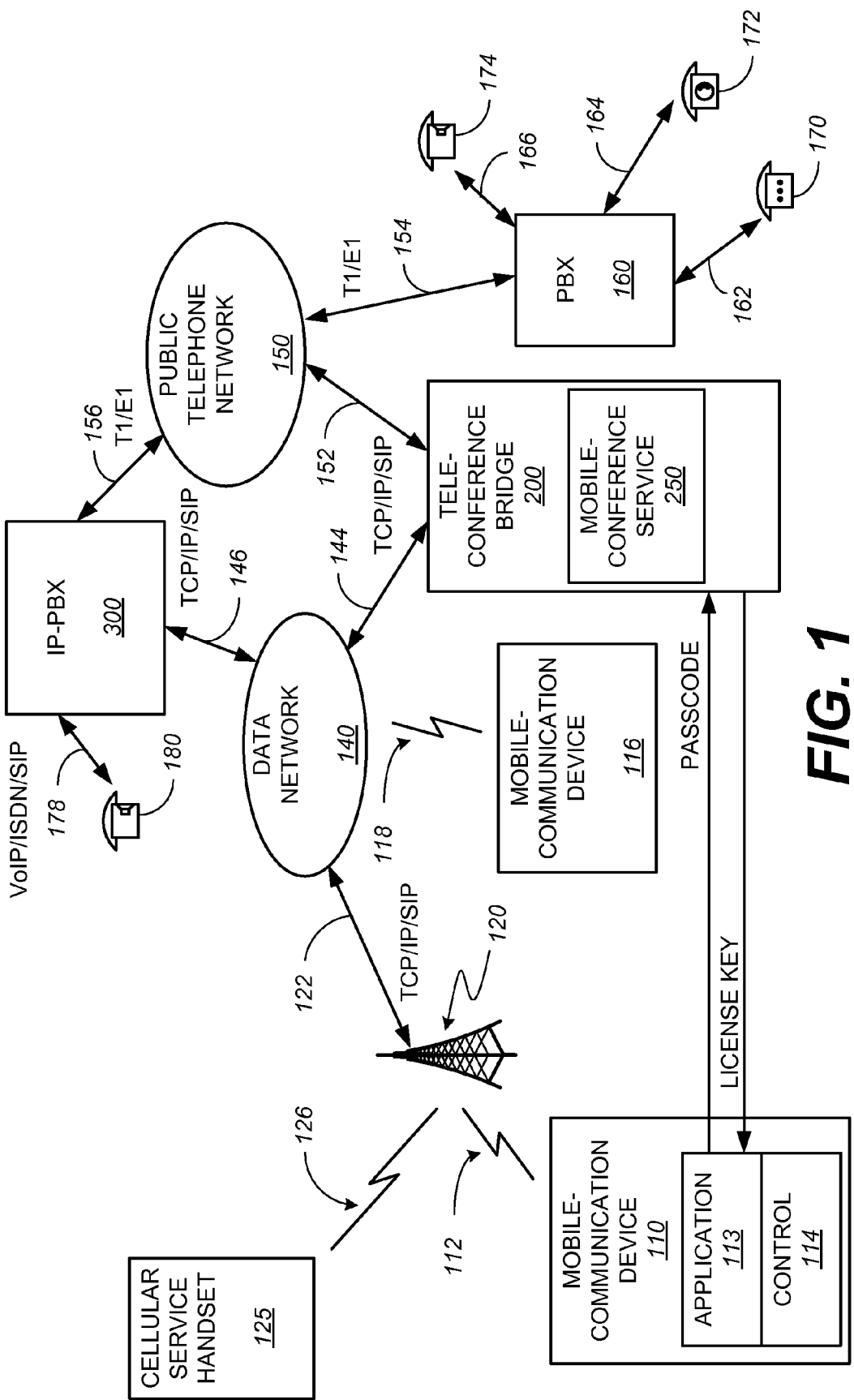
FIG. 1 is a schematic diagram illustrating an embodiment of a communication system.

Various embodiments of systems and methods for directing a mobile-communication device to a preferred teleconference bridge will be described with respect to FIGS. 1-7. A mobile, on-demand conference-call service includes one or more mechanisms for a present subscriber of mobile-communication services (i.e., voice or voice and data) to subscribe to an additional service. For example, a customer may complete basic account and service information via a website arranged to collect such information and interact with a service provider's accounting, billing and management functions to subscribe to the on-demand conference-call service.

Once a subscriber has subscribed to the service, the subscriber is sent one or more telephone numbers that the subscriber can use to access the on-demand conference-call service. The telephone number(s) can be sent to the subscriber via one or more of mail, email, and with device installable software. Regardless of the delivery mechanism for communicating the telephone number(s) to the subscriber, the subscriber is also sent application software on a computer-readable medium or is provided a link to a uniform resource locator associated with a fileserver that will provide the application software for download to a subscriber's mobile-communication device. The subscriber is also sent a license key that the subscriber will be prompted to enter the first time the application software is executed on the customer's mobile-communication device. The license key includes an encrypted representation of a pass code associated with the subscriber. The application software decrypts or otherwise translates the license key or a portion of the license key to generate the pass code. The pass code, when communicated to a teleconference bridge, authenticates the subscriber with the on-demand conference-call service.

The present systems and methods take advantage of the subscriber's presumed familiarity with entering a license key to install and operate application software on computers to get the subscriber to enter information that is used to generate a teleconference bridge recognized pass code that can be stored and used to authenticate and permit subscriber access to a preferred teleconference bridge.

The application software includes logic for integrating various input/output mechanisms available on the device with one or more menus and options that enable an operator to host or attend a conference via the on-demand conference-call service. The application software can be pre-programmed with telephone numbers associated with a desired teleconference bridge. The application software is configured to prompt the subscriber to enter the provided license key the first time the subscriber wants to host or attend a teleconference via the mobile-communication device. Thereafter, the subscriber's mobile-communication device uses the decrypted and stored pass code to authenticate the subscriber with the service. In alternative embodiments, the subscriber's mobile communication device stores the license key and uses the license key each time the subscriber initiates a call into the teleconference bridge to generate the pass code.

The application installation integrates an option with a primary function menu on the mobile-communication device. When an operator of the mobile-communication device selects the option, the device presents the operator a secondary menu with options to host or attend a conference call. In response to an operator selection of one of the host or attend a conference call options, the mobile-communication device initiates a call using the access number to a teleconference bridge. Entry into the teleconference bridge can be made via the combination of a caller identification recognition procedure and transmission of the pass code from the mobile-communication device. Manual or automated dialing permits teleconference bridge access from network locations where caller identification functions are not supported (e.g., overseas). When the caller identification recognition procedure is used, the teleconference bridge provides a first-level authentication of the caller by comparing the mobile-communication device's automatic number identification (ANI) to the subscriber's personal information. Once the teleconference bridge has identified the caller as a subscriber of the on-demand conference calling service, the subscriber's mobile-communication device is directed to forward the pass code before the subscriber's call is connected to one or more other lines via the teleconference bridge.

When the mobile-communication device belongs to a subscriber of the on-demand conference calling service and the operator has selected the "host" mode of operation, the teleconference bridge assigns appropriate bridge resources to establish and manage a conference call from the mobile-communication device. Otherwise, when the operator of the mobile-communication device has selected the "attend" mode of operation conference call management functions are not exposed to the operator. In some embodiments, the mobile-communication device is programmed such that an operator of the device is prompted to select or otherwise enter a control input to enable the bridge or join the call.

The ANI feature includes information about the originating station as well as the calling party station identifier (a phone number). The information is delivered in-band in the form of dual-tone multiple-frequency (DTMF) or other multiple frequency signals, or out-of-band with the integrated services digital network primary rate interface (ISDN PRI) based services and other data network based telecommunication services (e.g., voice over Internet protocol (VoIP)). When the ANI feature is communicated via out-of-band channels it is generally communicated in a data packet as part of the call configuration data. Data packet based communications can be accomplished via both wired and wireless communication networks. For in-band (e.g., T-1) communications, the ANI transmission format typically includes a key pulse that seizes the circuit followed by an information digit the 7 or 10-digit calling party station number and a start signal or acknowledgement from the network.

In addition to the website arranged to collect information to enroll subscribers, a service provider provides one or more reporting websites that enable a subscriber of the service to retrieve and present usage history, troubleshoot, configure account information, etc.

Having described the general operation of various embodiments of systems and methods to direct a mobile-communication device to a teleconference bridge, various additional embodiments will be described with respect to FIGS. 1-7. FIG. 1 is a schematic diagram illustrating a communication system 100. As illustrated in FIG. 1, communication system 100 comprises a mobile-communication device 110 in indirect communication with a number of telephonic devices via multiple networks and teleconference bridge 200. Mobile-communication device 110 is in communication with mobile network 120 via radio-frequency link 112. Mobile network 120 can be any available network that supports the use of a portable communication device with data and voice communication features. Mobile network 120 is in communication with cellular service handset 125 via radio-frequency link 126 and data network 140 via communication link 122. Mobile network 120 provides voice and data services to a subscriber with an appropriately configured handset such as cellular service handset 125 and mobile-communication device 110. Although mobile network 120 is depicted as a single tower, it should be understood that mobile network 120 comprises a set of geographically separated communication facilities with supporting communication session control for transferring the communication session from a first facility to a closely located second facility as a subscriber to the mobile network 120 moves from one location to another.

Data network 140 is in communication with Internet protocol-private branch exchange (IP-PBX) bridge 300 via communication link 146 and teleconference bridge 200 via communication link 144. Data network 140 is a wide area network that distributes information to and from coupled devices using indirect packet-based communication protocols such as transmission control protocol/Internet protocol (TCP/IP) and session initiation protocol (SIP). Communication links 122, 144 and 146 may be wired and or wireless communication links. As illustrated in FIG. 1, data network 140 is also in communication with one or more wireless access points that allow an appropriately configured mobile device such as mobile-communication device 116 to communicate via data network 140.

IP-PBX bridge 300 is also in communication with public-telephone network (PTN) 150 via communication link 156, which exposes one or more telephonic user devices to devices coupled to data network 150 and mobile network 120. In the illustrated embodiment, IP-PBX bridge 300 is coupled to speakerphone 180 via communication link 178. It should be understood that IP-PBX bridge 300 can be configured with multiple ports capable of communicating via wired and wireless communication media to additional telephonic devices. Telephonic devices coupled to IP-PBX bridge 300 may communicate using packet-based digital communication protocols such as VoIP, ISDN protocols and session initiation protocol (SIP). SIP is used for establishing, routing, modifying and terminating multimedia communication sessions, such as voice calls, on IP networks. A PBX with a native SIP interface will enable it to support a wide variety of SIP-based products and services, including wireless access points and phones, as well as conference room phones, residential access devices for teleworking, and domestic and international trunking services. SIP trunks connect systems from switch to switch or from switch to wireless access point, and handle the basic requirements such as on hook, off hook, ringing and busy. Handsets, speakerphones, or other end user devices offer many advanced features, such as conference, hold, park, transfer and camp-on that require control messages that go beyond the basic features defined in the SIP protocol.

Teleconference bridge 200, which is coupled to data network 140 via communication link 144, is also in communication with the PTN 150 via communication link 152. Teleconference bridge 200, as will be explained in further detail below, provides mobile-conference service 270 to subscribers of the service coupled to either of mobile network 120, data network 140 and PTN 150.

PTN 150 includes any number of local exchange carrier (LEC) central offices, access tandems, long-distance facilities, and other telecommunication switching systems. For example, PTN 150 includes a plurality of access switching systems, each typically comprised of a No. 4ESS switching system formerly manufactured by Western Electric (now Lucent Technologies, Inc.). Each access switching system is associated with one or more LECs for receiving calls originated by, and for sending calls to, customers served by a respective LEC. The access switching systems are interconnected, either directly or through one or more via switching systems. PTN 150 also includes a signaling network, such as AT&T's SS7 signaling network that includes one or more Signal Transfer Points (STPs) for collecting and routing signaling information, such as call set-up information, between and among the access switching systems and the via switching systems. In addition to the STPs, the signaling network also includes one or more network control points (NCPs) that take the form of databases that store information, including instructions and/or data for access by one or more of the switching systems and via switching systems to facilitate call processing.

As shown in FIG. 1, PBX 160 is in communication with PTN 150 via communication link 154 and with a number of telephonic devices such as speakerphone 174, rotary phone 172, and push-button phone 170. Speakerphone 174 is coupled to PBX 160 via communication link 166. Rotary phone 172 is in communication with PBX 160 via communication link 164. Pushbutton phone 170 is coupled to PBX 160 via communication link 162. Communication links 162, 164 and 166 are generally multiple-conductor wired analog links. It should be appreciated that analog and digital modems may be communicatively coupled to via PBX 160 and communication links 162, 164 and 166 to expose other communication devices such as computers and VoIP enabled handsets to devices coupled to PTN 150, data network 140 and mobile network 120.

Communication system 100 enables mobile-conference service 270 whereby one or more individual subscribers (represented by the various telephone stations and mobile-communication devices) may participate in a conference call. A conference host initiates the conference through the host subscriber's mobile voice and data service provider and teleconference bridge 200. Conference attendees each access the conference call through respective LECs, mobile service carriers, or data service providers.

A conference host communicates with teleconference bridge 200 using application logic 113 and one or more control mechanisms associated with mobile-communication device 110 via control interface 114. Conference attendees contact a particular conference call bridge by entering an access number and one or more other identifiers after establishing a call with teleconference bridge 200. It should be understood that each conference bridge includes a plurality of ports (not shown), that receive individual telephone calls from each of the conference host and one or more conference attendees that are bridged together to enable multiple participants to participate in the same call. When a subscriber of the service is the operator of a mobile-communication device, the device's ANI can be used to authenticate the subscriber, identify a previously scheduled conference and connect the subscriber to the conference.

As is further illustrated in FIG. 1, mobile-conference service 270 communicates the above-described license key to mobile-communication device 110. In return, mobile-communication device is programmed via the application software 113 to communicate an access authorization pass code to mobile-conference service 270. Additional prompts are pre-programmed into the mobile-communication device interface to enable the subscriber to provide the pass code one or more additional codes or other information that the subscriber and/or a conference host would readily be able to provide. When a subscriber is the operator of a communication device that is using VoIP to communicate with teleconference bridge 200, the subscriber will be authenticated when the teleconference bridge 200 receives a proper code or other information associated with a subscriber that is invited to join an identified teleconference.

While the illustrated embodiment of communication system 100 shows mobile network 120 coupled to PTN 150 via data network 140 and one or both of teleconference bridge 200 and IP-PBX 300, those of ordinary skill in the art of networks will understand that mobile network 120 can be otherwise coupled to PTN 150 to complete calls.

Figure 2:
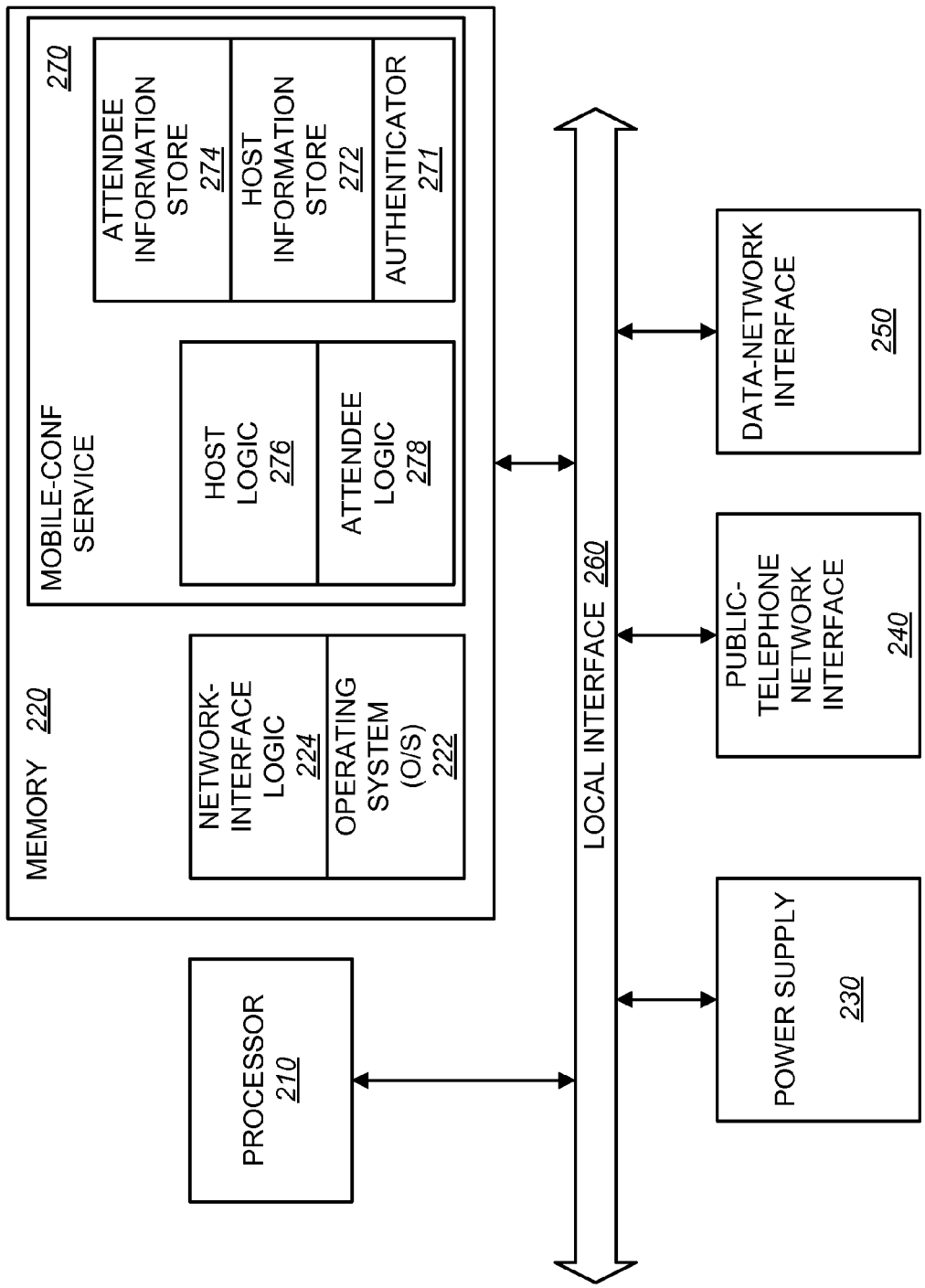
FIG. 2 is a block diagram illustrating an embodiment of the teleconference bridge of FIG. 1.

FIG. 2 is a block diagram illustrating an embodiment of the teleconference bridge 200 of FIG. 1. Generally, in terms of hardware architecture, as shown in FIG. 2, teleconference bridge 200 includes processor 210, memory 220, power supply 230, PTN interface 240 and data-network interface 250. Processor 210, memory 220, PTN interface 240 and data-network interface 250 are communicatively coupled via a local interface 260. The local interface 260 can be, for example but not limited to, one or more buses or other wired or wireless connections, as is known in the art. The local interface 260 may have additional elements, which are omitted for simplicity, such as controllers, buffers (caches), drivers, repeaters, and receivers, to enable communications. Further, the local interface 260 may include address, control, and/or data connections to enable appropriate communications among the aforementioned components.

Power supply 230 provides power to each of the processor 210, memory 220, PTN 240, data-network interface 250 and local interface 260 in a manner understood by one of ordinary skill in the art.

Processor 210 is a hardware device for executing software, particularly that stored in memory 220. The processor 210 can be any custom made or commercially available processor, a central processing unit (CPU), an auxiliary processor among several processors associated with the teleconference bridge 200, a semiconductor based microprocessor (in the form of a microchip or chip set), or generally any device for executing software instructions.

The memory 220 can include any one or combination of volatile memory elements (e.g., random-access memory (RAM), such as dynamic random-access memory (DRAM), static random-access memory (SRAM), synchronous dynamic random-access memory (SDRAM), etc.) and nonvolatile memory elements (e.g., read-only memory (ROM), hard drive, tape, compact disk read-only memory (CD-ROM), etc.). Moreover, the memory 220 may incorporate electronic, magnetic, optical, and/or other types of storage media. Note that the memory 220 can have a distributed architecture, where various components are situated remote from one another, but can be accessed by the processor 210.

The software in memory 220 may include one or more separate programs, each of which comprises an ordered listing of executable instructions for implementing logical functions. In the example of FIG. 2, the software in the memory 220 includes operating system 222, network-interface logic 224 and mobile-conference service 270. The operating system 222 essentially controls the execution of other computer programs, such as network-interface logic 224 and mobile-conference service 270 and provides scheduling, input-output control, file and data management, memory management, and communication control and related services.

Network-interface logic 224 comprises one or more programs and one or more data elements that enable the mobile-conference service 270 to communicate with external devices via PTN interface 240 and data-network interface 250. In this regard, network-interface logic 224 may include one or buffers and parameter stores for holding configuration information and or data as may be required.

Mobile-conference service 270 includes host logic 276, attendee logic 278, authenticator 271, host information store 272 and attendee information store 274. Authenticator 271 extracts the ANI and compares the extracted ANI with subscriber information store 271 to ensure that an operator of a communication device that is communicating with teleconference bridge 200 is a subscriber of the on-demand mobile-conference calling service. When it is desired to use additional mechanisms to secure the service and/or ensure that a subscriber with application software 113 is directed to a particular service (i.e., mobile-conference service 270), authenticator 271 initiates a prompt which is communicated to the subscriber's mobile-communication device 110. Application software 113 (FIG.1) on mobile-communication device 110 responds by forwarding the pass code back to the teleconference bridge 200.

As described above, mobile-communication device 110 may store the pass code or translate or otherwise decrypt the pass code from the stored license key. The pass code and/or license key is stored in one or both of host information store 272 and attendee information store 274. The stored pass codes and/or license keys may differ from one another to distinguish whether the subscriber is acting as a conference host or is simply attending a conference call.

Host logic 276 includes executable instructions for establishing and managing a conference call from a conference host. Host logic 276 includes logic for responding to various PTN 150 and data network 140 control signals, and inputs entered from host subscribers. Inputs entered from host subscribers include a list of conference call control commands that are issued via a communication device such as mobile-communication device 110 that are exposed to host subscribers. Some of these commands are issued by entering a multiple-digit code using one or more controls available on mobile-communication device 110. Other commands may be issued in direct response to the selection of an option via a menu presented on a graphical-user interface on mobile-communication device 110. Attendee logic 278 includes executable instructions for connecting to a conference call. Attendee logic 278 includes logic for responding to various PTN 150 and data network 140 control signals, and inputs entered from conference attendees. Conference attendees may or may not be subscribers of the mobile-conference service 270. When a conference attendee is not a subscriber of the mobile-conference service 270, attendee logic 278 controls access to the teleconference bridge in response to information previously entered or otherwise provided by a host subscriber. Under these circumstances, inputs entered by attendees are limited to control of the communication device being used to contact teleconference bridge 200.

Network-interface logic 224, host logic 276, attendee logic 278 and authenticator 271 are source programs, executable programs (object code), scripts, or any other entities comprising a set of instructions to be performed. When implemented as source programs, the programs are translated via a compiler, assembler, interpreter, or the like, which may or may not be included within the memory 220, so as to operate properly in connection with the O/S 222. Furthermore, network-interface logic 224 and mobile-conference service 270 can be written in one or more object oriented programming languages, which have classes of data and methods, or procedure programming languages, which has routines, subroutines, and/or functions. In the currently contemplated best mode, network-interface logic 224 and mobile-conference service 270 are implemented in software, as executable programs executed by processor 210.

PTN interface 240 enables teleconference bridge 200 to communicate with various devices, including IP-PBX 300, over PTN 150 (FIG. 1) via connection 152. The PTN interface 240 performs a variety of functions including, for example: answering a phone line; hanging-up a phone line; dialing a phone number; sending fax data; receiving fax data; sending data signals; receiving data signals; generating DTMF tones; detecting DTMF tones; receiving ANI and DNIS, playing voice messages; and converting voice signals between analog and digital formats.

Data-network interface 250 enables teleconference bridge 200 to communicate with various devices, including IP-PBX 300 over the data network 140 (FIG. 1) via connection 144. The data-network interface 250 performs the signal conditioning and format conversions to communicate data through the data network 140. An example data-network interface 250 is compatible with the 100BaseT Ethernet standard and the TCP/IP protocol. It should be understood that other data-network interfaces including, for example and without limitation, wired and wireless data-network interfaces, analog-network interfaces, digital data-network interfaces, optical data-network interfaces, and network interfaces compatible with other hardware and software standards and protocols may also be used.

When teleconference bridge 200 is in operation, the processor 210 is configured to execute software stored within the memory 220, to communicate data to and from the memory 220, and to generally control operations of the teleconference bridge 200 pursuant to the software. The network-interface logic 224, mobile-conference service 270 and the O/S 222, in whole or in part, but typically the latter, are read by the processor 210, perhaps buffered within the processor 210, and then executed.

When the network-interface logic 224 and mobile-conference service 270 are implemented in software, as is shown in FIG. 2, it should be noted that these software elements can be stored on any computer-readable medium for use by or in connection with any computer related system or method. In the context of this document, a "computer-readable medium" can be any means that can store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a RAM (electronic), a ROM (electronic), an erasable programmable read-only memory (EPROM), an electrically erasable programmable read-only memory (EEPROM), or Flash memory) (electronic), an optical fiber (optical), and a CDROM (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where one or more of the network-interface logic 224 and mobile-conference service 270 are implemented in hardware, the network-interface logic 224 and mobile-conference service 270 can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field-programmable gate array (FPGA), etc.

Figure 3:
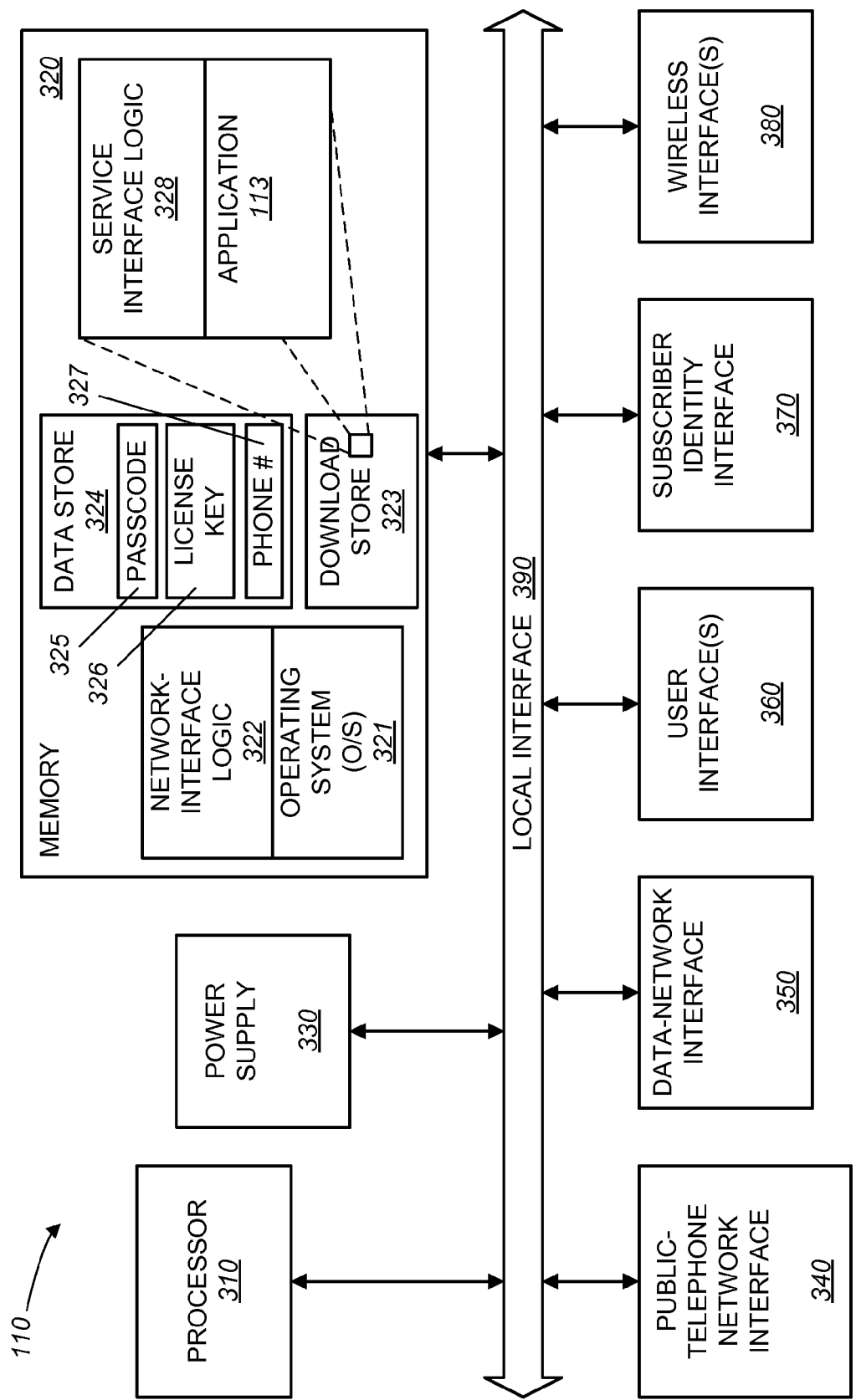
FIG. 3 is a block diagram illustrating an embodiment of the mobile-communication device of FIG. 1.

FIG. 3 is a block diagram illustrating an embodiment of the mobile-communication device 110 of FIG. 1. Generally, in terms of hardware architecture, as shown in FIG. 3, mobile-communication device 110 includes processor 310, memory 320, power supply 330, PTN interface 340, data-network interface 350, user interface(s) 360, subscriber identity interface 370 and wireless interface(s) 380. Processor 310, memory 320, PTN interface 340, data-network interface 350, user interface(s) 360, subscriber identity interface 370 and wireless interface(s) 380 are communicatively coupled via a local interface 390. The local interface 390 can be, for example but not limited to, one or more buses or other wired or wireless connections, as is known in the art. The local interface 390 may have additional elements, which are omitted for simplicity, such as controllers, buffers (caches), drivers, repeaters, and receivers, to enable communications. Further, the local interface 390 may include address, control, and/or data connections to enable appropriate communications among the aforementioned components.

Power supply 330 provides power to each of the processor 310, memory 320, PTN interface 340, data-network interface 350, user interface(s) 360, subscriber identity interface 370, wireless interface(s) 380 and local interface 390 in a manner understood by one of ordinary skill in the art.

Processor 310 is a hardware device for executing software, particularly software stored in memory 320. The processor 310 can be any custom made or commercially available processor, a CPU, an auxiliary processor among several processors associated with the mobile-communication device 110, a semiconductor based microprocessor (in the form of a microchip or chip set), or generally any device for executing software instructions.

The memory 320 can include any one or combination of volatile memory elements (e.g., RAM, such as DRAM, SRAM, SDRAM, etc.)) and nonvolatile memory elements (e.g., ROM, hard drive, tape, CDROM, etc.). Moreover, the memory 320 may incorporate electronic, magnetic, optical, and/or other types of storage media. Note that the memory 320 can have a distributed architecture, where various components are situated remote from one another, but can be accessed by the processor 310. Components within memory 320 include storage locations for software programs and data items.

The software in memory 320 may include one or more separate programs, each of which comprises an ordered listing of executable instructions for implementing logical functions. In the example of FIG. 3, the software in the memory 320 includes operating system 321, network-interface logic 322, application software 113 and service interface logic 328. The operating system 321 essentially controls the execution of other programs, such as network-interface logic 322 and provides scheduling, input-output control, file and data management, memory management, and communication control and related services.

Network-interface logic 322 comprises one or more programs and one or more data elements that enable the mobile-communication device 110 to receive and forward communication streams between mobile network 120, data network 140 and PTN 150. In this regard, network-interface logic 322 may include one or buffers and parameter stores for holding configuration information and or data as may be required.

Memory 320 further includes download store 323 and data store 324. As indicated in FIG. 3, data store 324 includes storage locations for pass code 325, license key 326, and telephone number 327. As described above, pass code 325 is generated using application 113 from license key 326. Application 113 translates or otherwise decrypts all or a portion of the service provided license key 326 to create pass code 325. Download store 323 includes service interface logic 328 and application 113. Service interface logic 328 enables an operator of mobile-communication device 110 to communicate with mobile-conference service 270 via one or more networks and teleconference bridge 200.

Network-interface logic 322, application 113 and service interface logic 328 are source programs, executable programs (object code), scripts, and the like that include a set of executable instructions to be performed. When implemented as source programs, the programs are translated via a compiler, assembler, interpreter, or the like, which may or may not be included within the memory 320, so as to operate properly in connection with the O/S 321. Furthermore, network-interface logic 322, application 113 and service interface logic 328 can be written in one or more object-oriented programming languages, which have classes of data and methods, or procedure programming languages, which have routines, subroutines, and/or functions. In the currently contemplated best mode, network-interface logic 322, application 113 and service interface logic 328 are implemented in software, as an executable program executed by processor 310.

PTN interface 340 enables mobile-communication device 110 to communicate with various devices, including teleconference bridge 200, over the PTN 150 (FIG. 1) via connection 156. The PTN interface 340 performs a variety of functions including, for example: answering a phone line; hanging-up a phone line; dialing a phone number; sending data signals; receiving data signals; generating DTMF tones; detecting DTMF tones; receiving ANI and DNIS signals; and playing voice messages.

Data-network interface 350 enables mobile-communication device 110 to communicate with various devices, including devices coupled to teleconference bridge 200, over the data network 140 (FIG. 1) via connection 146. Data-network interface 350 performs the signal conditioning and format conversions to communicate data through the data network 140. An example data-network interface 350 is compatible with the 100BaseT Ethernet standard and the TCP/IP protocol. It should be understood that other data-network interfaces including, for example and without limitation, wired and wireless data-network interfaces, analog network interfaces, digital data-network interfaces, optical data-network interfaces, and network interfaces compatible with other hardware and software standards and protocols may also be used.

User interfaces 360 include multi-function operational controls such as pushbuttons, thumbwheels, and other mechanisms that close switches. User interfaces 360 further include a graphical-user interface that uses various displays, menus, icons and the like to controllably expose the various functions and capabilities to the operator of mobile-communication device 110. Subscriber identity interface 370 communicates with a subscriber identity module (SIM) that includes user identification information and operator added contact information including names, addresses, and telephone numbers associated with respective contacts. Wireless interfaces 380 work in conjunction with one or all of PTN interface 340, data-network interface 350, and SIM interface 370 to enable wireless communication between mobile-communication device 110, mobile network 120, data network 140 and PTN 150.

When mobile-communication device 110 is in operation, the processor 310 is configured to execute software stored within the memory 320, to communicate data to and from the memory 320, and to generally control operations of the mobile-communication device 110 pursuant to the software. The network-interface logic 322, application 113, service interface logic 328 and the O/S 321, in whole or in part, but typically the latter, are read by the processor 310, perhaps buffered within the processor 310 and then executed.

When the network-interface logic 322, application 113, service interface logic 328 and the O/S 321 are implemented in software, as is shown in FIG. 3, it should be noted that the network-interface logic 322, application 113, service interface logic 328 and the O/S 321 can be stored on any computer-readable medium for use by or in connection with any computer related system or method. In an alternative embodiment, where the network-interface logic 322, application 113, service interface logic 328 and the O/S 321 are implemented in hardware, the network-interface logic 322, application 113, service interface logic 328 and the O/S 321 can be implemented with any or a combination of the following technologies, which are each well known in the art: a discrete logic circuit(s) having logic gates for implementing logic functions upon data signals, an ASIC having appropriate combinational logic gates, a PGA, a FPGA, etc.

Figure 4A:
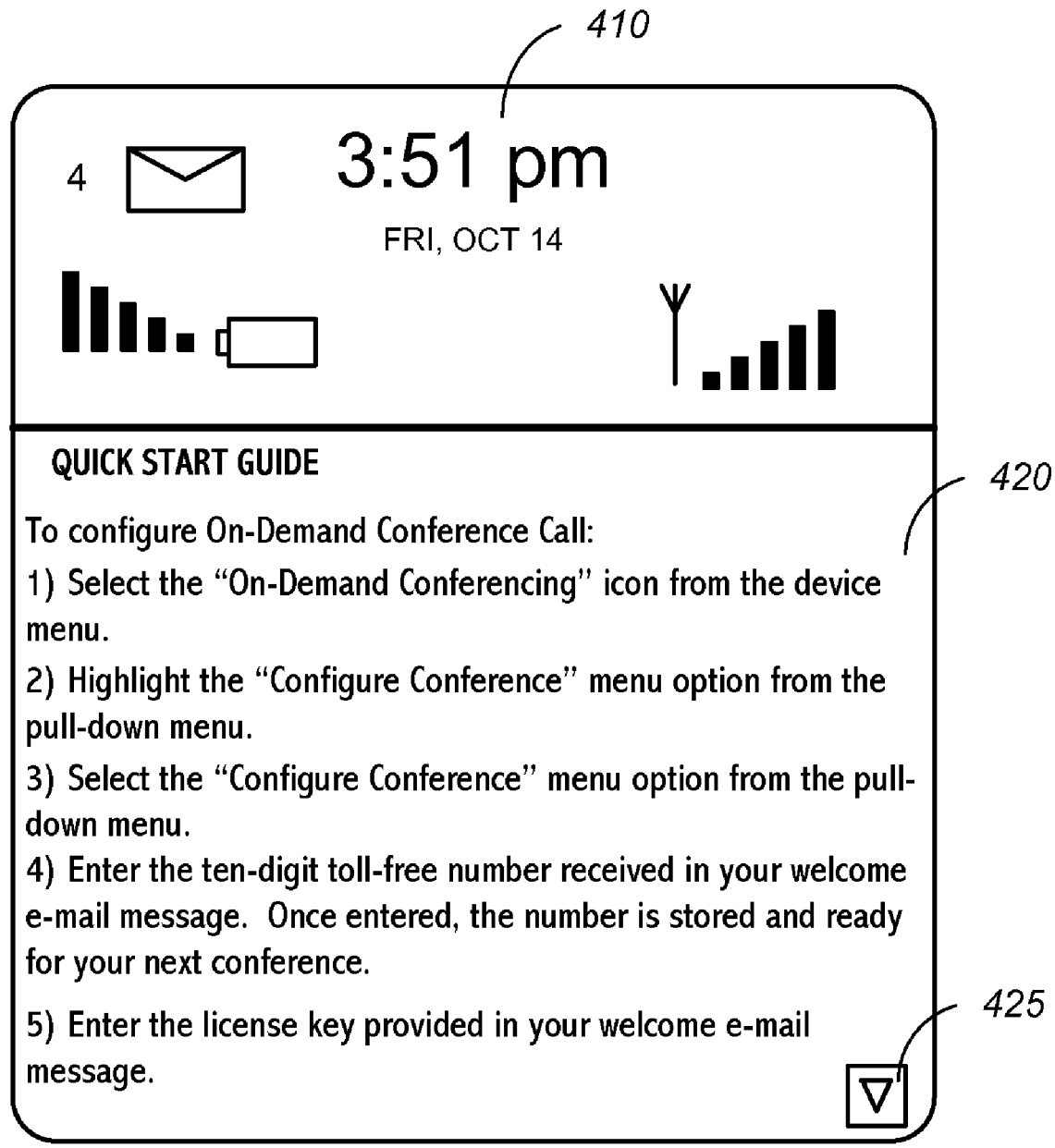

FIGS. 4A through 4F are schematic diagrams illustrating embodiments of a graphical-user interface 400 on the mobile-communication device 110 of FIG. 1. FIG. 4A is an embodiment of a graphical-user interface on the mobile-communication device 110 of FIG. 1. As illustrated in FIG. 4A, graphical-user interface 400 comprises a header 410 and frame 420. Header 410 provides information that is consistently updated and displayed while mobile-communication device 110 is activated and functioning in a message handling mode of operation. Header 410 comprises time, day and date information as well as a message storage field that shows how many new messages have been received and stored on mobile-communication device 110. Header 410 also includes battery and signal indicators, which provide a visual indication of battery condition and received signal strength.

Frame 420 presents a text narrative that conveys a quick start guide concerning operation of the mobile-conference call service. Included in frame 420 is scroll indicator 425 indicating that additional information within the quick start guide is available. When an operator of mobile-communication device 110 uses a control to selectively scroll down through the quick start guide narrative, a second scroll indicator (not shown) is added to the upper right of frame 420. The second scroll indicator is presented when it is the case that an upper portion of the quick start guide is not rendered within frame 420. As indicated in items 4 and 5 of the quick start guide, the subscriber is prompted to enter a ten-digit toll-free access number and a license key, respectively to configure the mobile-communication device 110.

Figure 4C:
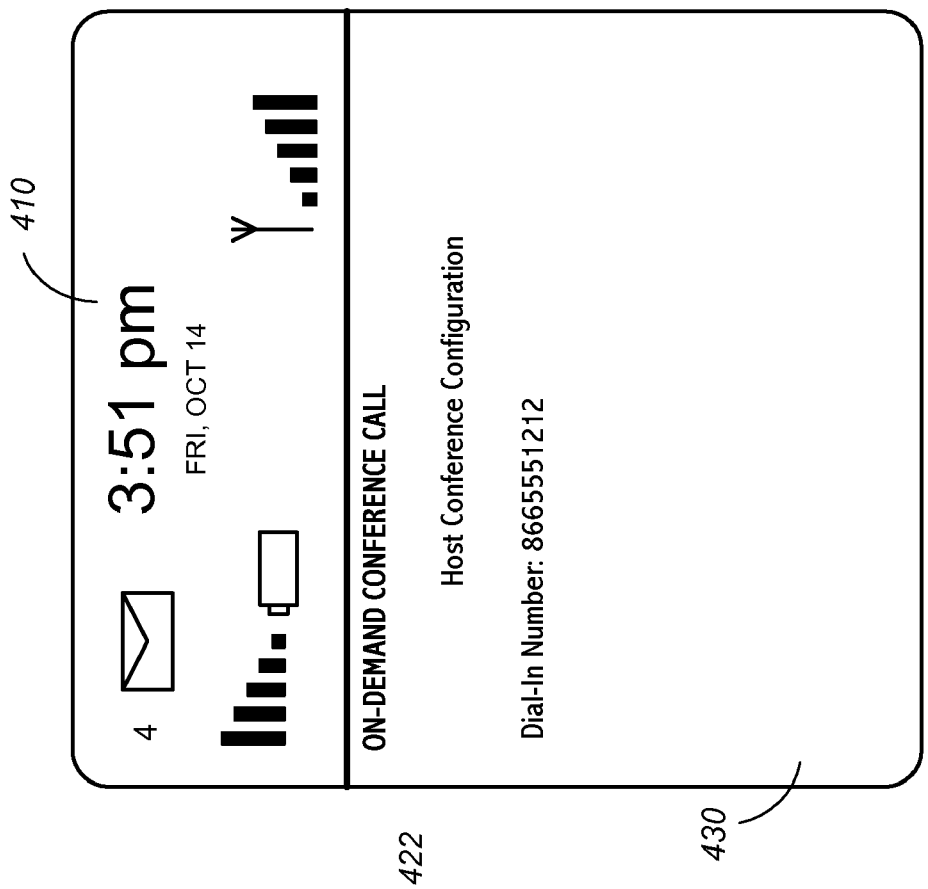
Figure 4B:
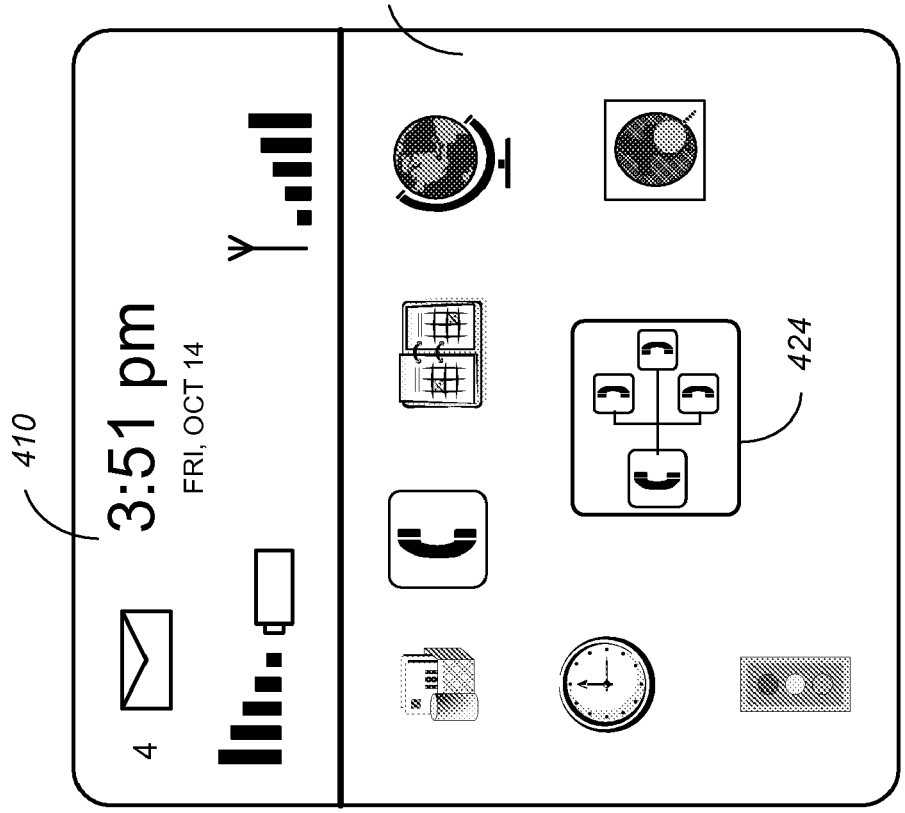

FIG. 4B illustrates a second embodiment of the graphical-user interface 400 as rendered and presented on a display associated with mobile-communication device 110. Graphical-user interface 400 comprises header 410 and frame 422. Frame 422 presents a main menu of tools and modes of operation available to and selectable by an operator of mobile-communication device 110. An operator of mobile-communication device 110 can navigate through the main menu by using a position control associated with the mobile-communication device to controllably position window 424 over an icon representing a desired function. In the illustrated embodiment, an operator of the mobile-communication device 110 has moved position window 424 over an icon representing an on-demand conference call. FIG. 4C shows graphical-user interface 400 after an operator of the mobile-communication device 110 has selected a host conference call mode of operation and entered a dial-in number via one or more controls available on the mobile-communication device 110. In one embodiment, the dial-in number is stored within an address book on the mobile-communication device 110 and is identical to the access number provided to the subscriber when the operator of the mobile-communication device 110 subscribed to the on-demand mobile conference call service.

FIG. 4D shows graphical-user interface 400 after an operator of the mobile-communication device 110 has used one or more controls to initiate pull-down menu 442. Pull-down menu 442 includes a number of options for selecting various operational modes, configuring features and managing the menu and on-demand mobile-conference calling service. As illustrated in FIG. 4D an operator of mobile-communication device 110 selects pull-down menu options by controllably positioning highlight bar 445 over a desired option and entering a "select" control input available on the mobile-communication device 110.

FIG. 4E shows graphical-user interface 400 after an operator of the mobile-communication device 110 has used one or more controls to select the "Call Features" option from the pull-down menu 442 (FIG. 4D). Graphical-user interface 400 includes frame 450 which presents a narrative explaining how a conference call host can contact a mobile conference call service assistant. Included in frame 450 is scroll indicator 455 indicating that additional information within the call features narrative is available. When an operator of mobile-communication device 110 uses a control to selectively scroll down through the call features narrative, a second scroll indicator (not shown) is added to the upper right of frame 450. The second scroll indicator is presented when it is the case that an upper portion of the call features narrative is not rendered within frame 450. Additional multiple digit codes other than those shown in FIG. 4E may be operational via mobile-communication device 110.

Figure 4F:
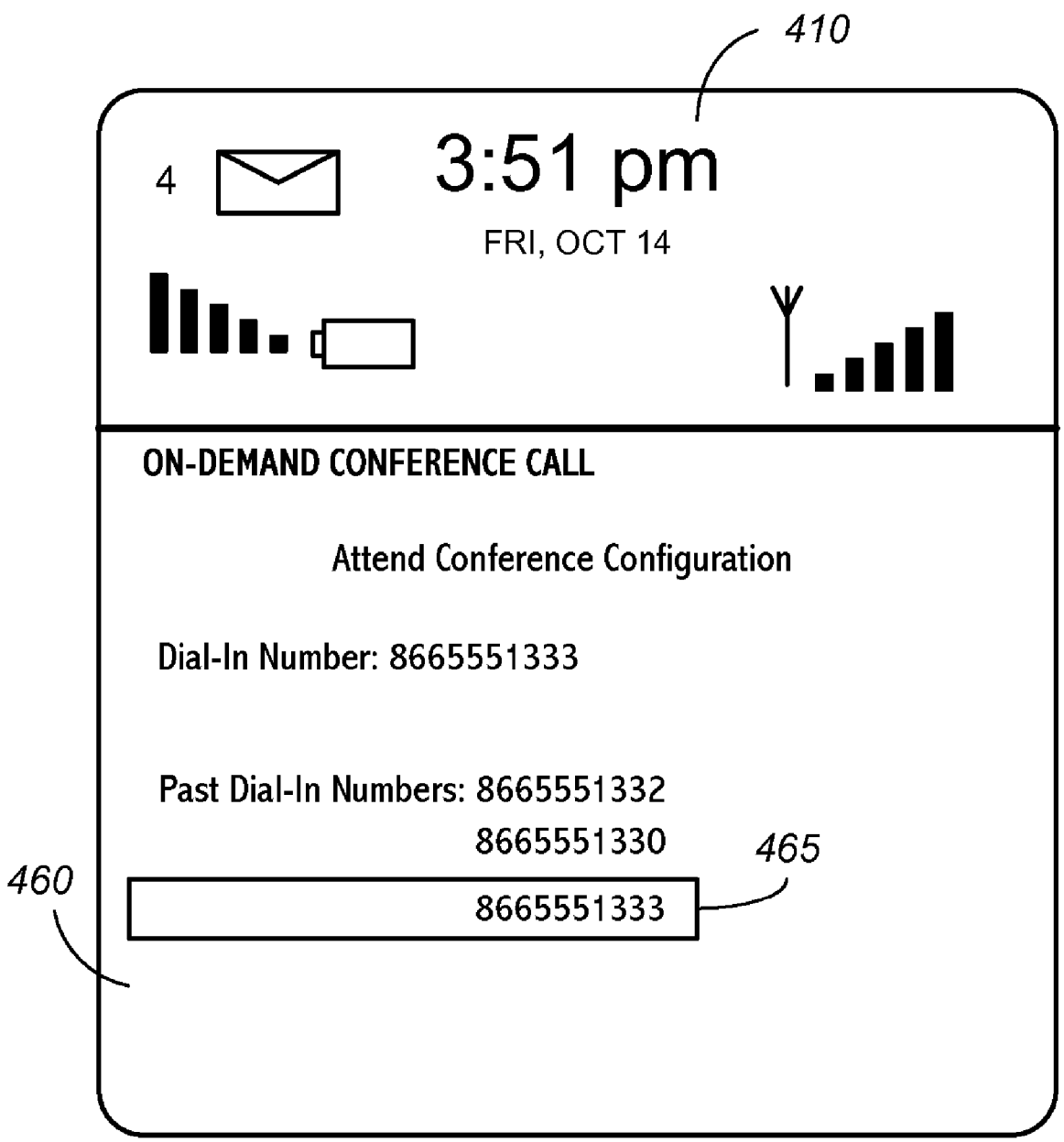

FIG. 4F shows graphical-user interface 400 after an operator of the mobile-communication device 110 has used one or more controls to select the "Attend Conference" option from the pull-down menu 442 (FIG. 4D) and entered a dial-in number. Graphical-user interface 400 includes frame 460 which presents a list of previously used dial-in numbers as entered on the mobile-communication device 110. As illustrated in FIG. 4F, an operator of the mobile-communication device 110 can use one or more control inputs to controllably position selection frame 465 over a desired dial-in number present in the list and select the number. Thereafter, application 113 will initiate a call to the teleconference bridge 200, wait for the pass code, and if appropriate add the caller to a conference call.

While the graphical-user interfaces presented in FIGS. 4A through 4F show specific embodiments of frames, menu options, fields, etc., it will be appreciated that any number of fields, menus, options, or messages might be added to the interfaces described herein, for purposes of enhanced utility, accounting, troubleshooting, etc. All such variations are within the scope of the present systems and methods for directing a mobile-communication device to a preferred teleconference bridge.

Figure 5:
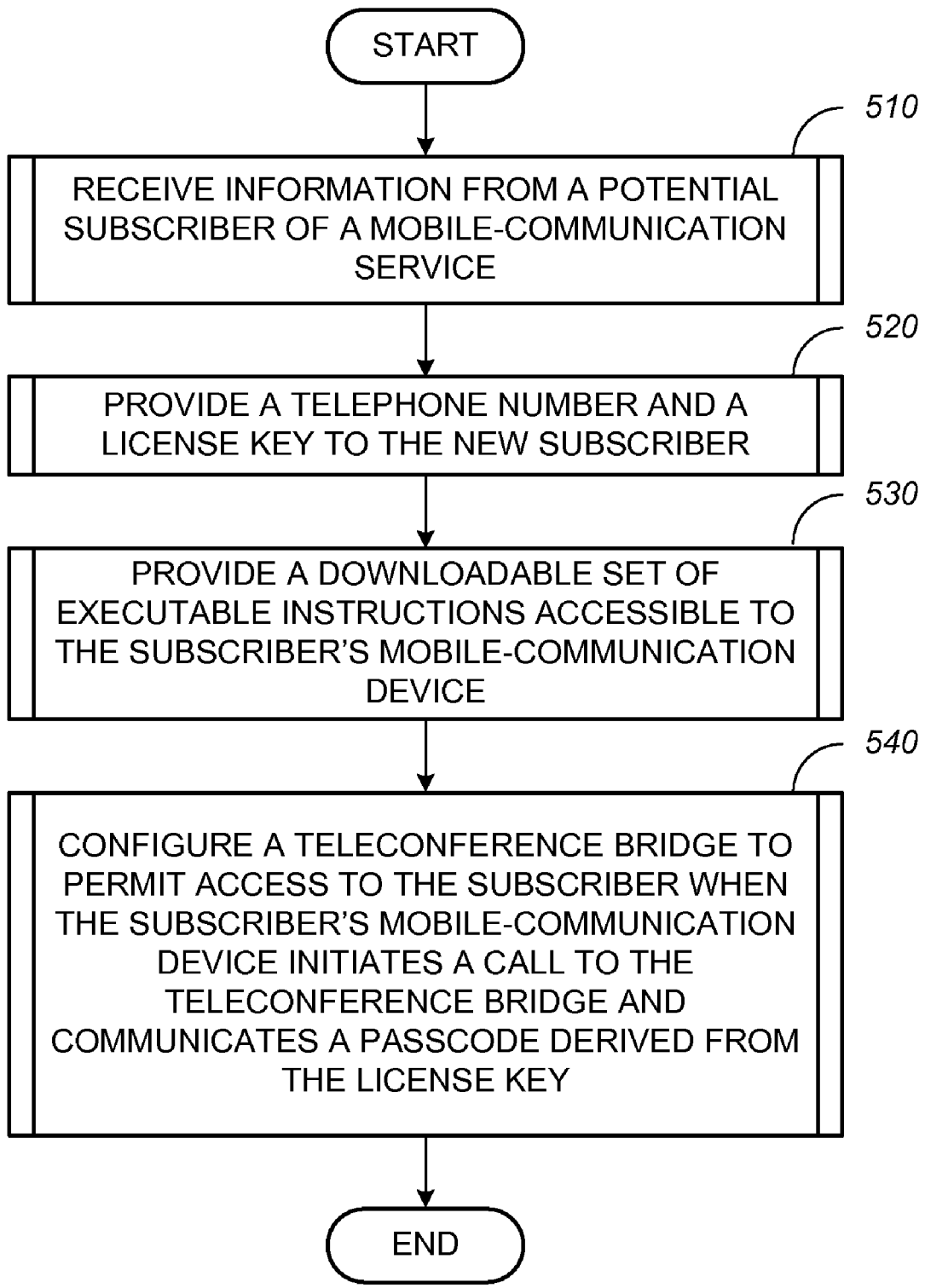
FIG. 5 is a flow diagram illustrating an embodiment of a method for directing a mobile-communication device to a preferred teleconference bridge.

FIG. 5 is a flow diagram illustrating an embodiment of a method for directing a mobile-communication device to a preferred teleconference bridge. The flow diagram of FIG. 5 shows the architecture, functionality, and operation of a possible implementation via software and or firmware operable on a teleconference bridge or other suitable computing device. In this regard, each block represents a module, segment, or portion of code, which comprises one or more executable instructions for implementing the specified function(s).

Method 500 begins with block 510 where a service provider receives information from a potential subscriber of a mobile-communication service. In some embodiments, the mobile-communication device is a cellular telephone and the service provider is the provider of an on-demand conference call service such as mobile-conference service 270. As indicated in block 520, a service provider provides a telephone number and a license key to the new subscriber. In block 530, the service provider provides a downloadable set of executable instructions to the subscriber's mobile-communication device. Typically, the service provider forwards a self-installing application or otherwise provides a Java application on the mobile-communication device 110. In block 540, the service provider configures a teleconference bridge to permit access to the subscriber when the subscriber's mobile-communication device initiates a call to the teleconference bridge and communicates a pass code derived from a service provided license key previously associated with the subscriber. Once, the steps illustrated and described in association with blocks 510, 520, 530 and 540 are complete; an operator of the mobile-communication device 110 can use the on-demand mobile-conference service by contacting the teleconference bridge 200.

When operable, the mobile-communication device 110, via the Java application and teleconference bridge 200 enable an operator of the mobile-communication device 110 to host or attend a conference. When the operator of the mobile-communication device 110 has entered a host mode, the mobile-communication device 110 responds to one or more operator inputs with menus and or menu options as described above.

Figure 6:
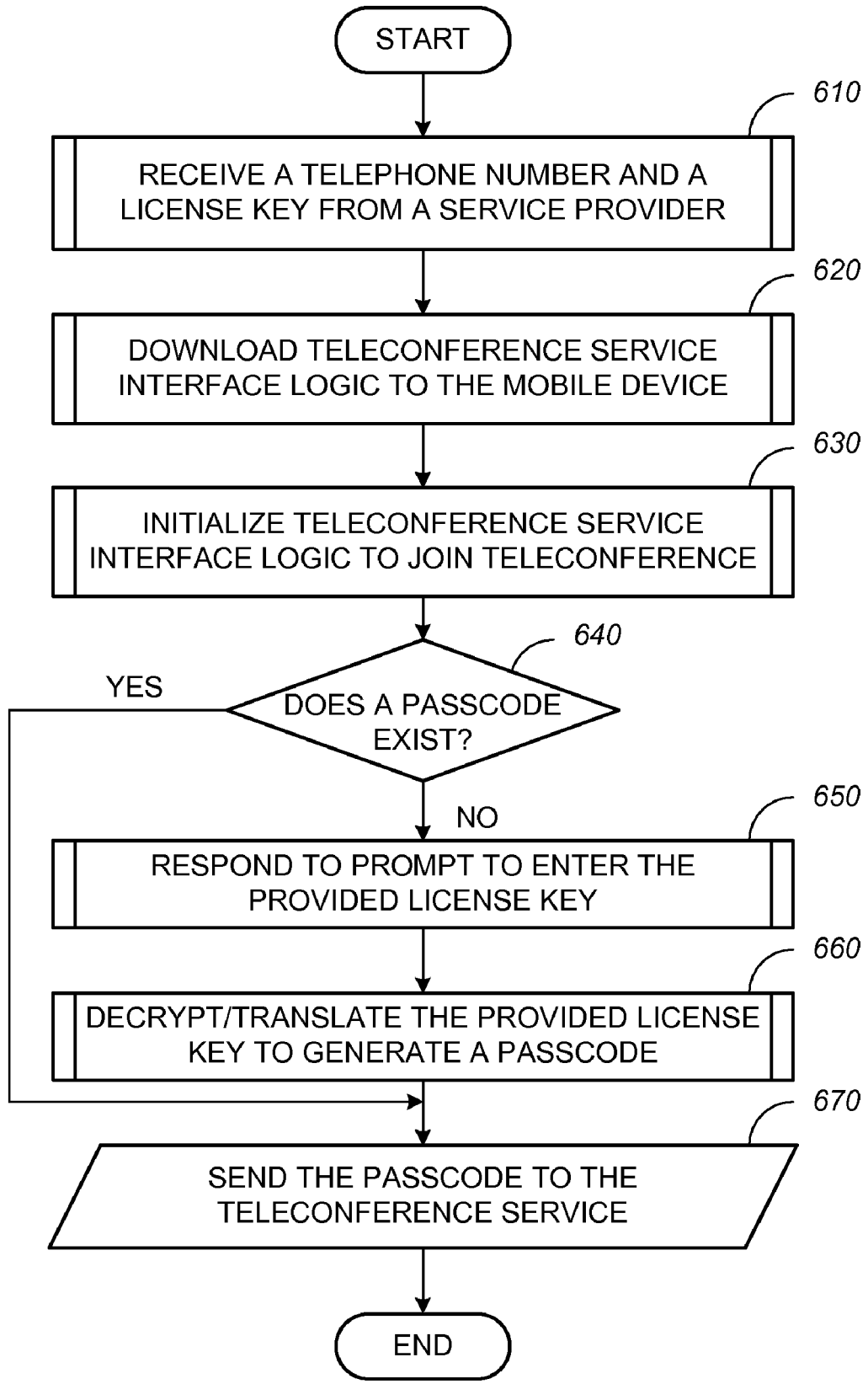
FIG. 6 is a flow diagram illustrating an embodiment of a method for configuring a mobile-communication device to access a teleconference bridge.

FIG. 6 is a flow diagram illustrating an embodiment of a method for configuring a mobile-communication device to access a teleconference bridge. The flow diagram of FIG. 6 shows the architecture, functionality, and operation of a possible implementation via software and or firmware associated with a mobile-communication device. In this regard, each block represents a module, segment, or portion of code, which comprises one or more executable instructions for implementing the specified function(s).

Method 600 begins with block 610 where a potential subscriber receives a telephone number and a license key from a service provider. The received information identifies the subscriber as a party having access privileges. In some embodiments, the mobile-communication device is a cellular telephone and the service provider is the provider of a mobile-conference service. As indicated in block 620, the subscriber downloads or otherwise installs teleconference service interface logic on a mobile-communication device. In block 630, the subscriber initializes (i.e., executes) the teleconference service interface logic to join a teleconference. In block 640, a determination is automatically made on the mobile-communication device whether a pass code exists in storage on the device. When, as indicated by the flow control arrow labeled, "NO" exiting decision block 640, it is determined that a pass code is not available in storage on the mobile-communication device, the service interface logic directs the user interface to prompt the subscriber to enter a previously provided license key as shown in block 650. Thereafter, as indicated in block 660, the mobile-communication device decrypts or otherwise translates the license key to create the pass code.

Otherwise, when it is determined that a pass code is available in storage on the mobile-communication device (i.e., upon a subsequent attempt to access a teleconference), as indicated by the flow control arrow labeled "YES" exiting decision block 640, the mobile-communication device jumps to block 670 and sends the pass code to a teleconference bridge associated with the service provider.

Figure 7:
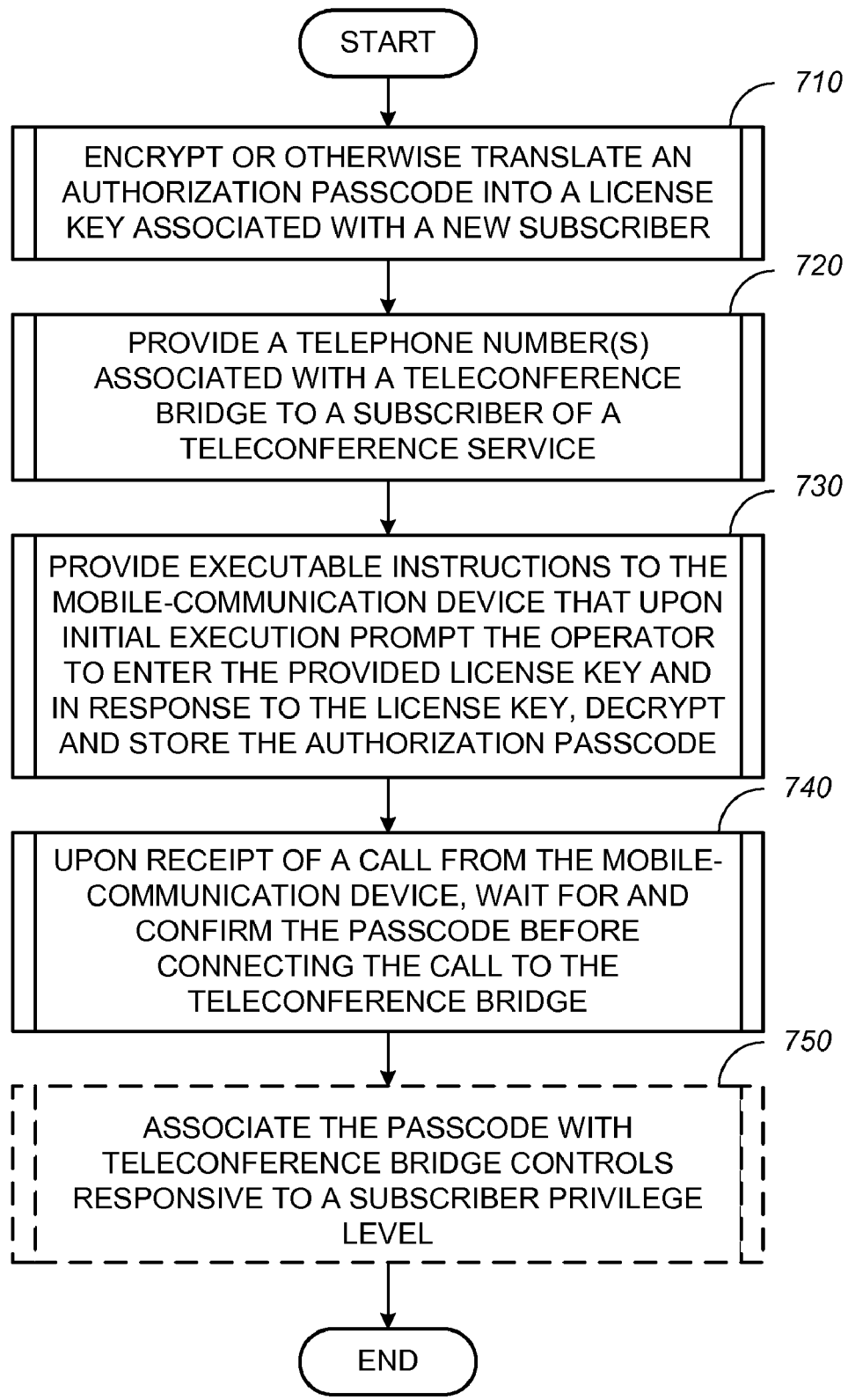
FIG. 7 is a flow diagram illustrating an alternative embodiment of a method for configuring a mobile-communication device and directing a call from the mobile-communication device to a preferred teleconference bridge.

FIG. 7 is a flow diagram illustrating an alternative embodiment of a method for configuring a mobile-communication device and directing a call from the mobile-communication device to a preferred teleconference bridge. The flow diagram of FIG. 7 shows the architecture, functionality, and operation of a possible implementation via software and or firmware associated with a mobile-conference service operable on a teleconference bridge. In this regard, each block represents a module, segment, or portion of code, which comprises one or more executable instructions for implementing the specified function(s).

Method 700 begins with block 710 where the mobile-conference service encrypts a pass code in a license key associated with a new subscriber to the service. In block 720, the mobile-conference service provides one or more telephone numbers to the new subscriber. In block 730, the mobile-conference service provides executable instructions to the subscriber for installation on the subscriber's mobile-communication device. The executable instructions are configured such that upon initial execution, the subscriber is prompted to enter the provided license key. In response to the entered license key, the executable instructions decrypt and store the pass code on the mobile-communication device. As indicated in block 740, upon receipt of a call from the mobile-communication device made via the provided telephone number, the mobile-conference service waits for and confirms the pass code before connecting the mobile-communication device initiated call to other lines or communication paths via the teleconference bridge. Thereafter, mobile-conference service optionally associates the pass code with teleconference bridge controls responsive to a subscriber privilege level, as indicated in block 750. For example, a conference call host may be granted access to conference level controls for muting and unmuting specific callers, adding callers to the conference, dropping select callers, etc. In contrast, a conference attendee may be granted controls for muting or unmuting only their own line.

As described above, the flow diagrams of FIGS. 5-7 show the architecture, functionality and operation of an implementation of alternative example methods for directing a mobile-communication device to a preferred teleconference bridge. The program instructions may be embodied in source code that comprises human-readable statements written in a programming language or machine code that comprises numerical instructions recognizable by a suitable execution system such as a processor in a computing device. The machine code may be converted from the source code, etc. If embodied in hardware, each block may represent a circuit or a number of interconnected circuits to implement the specified logical function(s).

While the flow diagrams of FIGS. 5-7 show specific sequences of execution, it will be appreciated that two or more steps in a respective diagram that are shown in succession may be executed concurrently, with or without partial concurrence, and in some situations out-of-sequence. In addition, any number of counters, state variables, warning semaphores, or messages might be added to the logical flow described herein, for purposes of enhanced utility, accounting, performance measurement, troubleshooting, etc. All such variations are within the scope of the present systems and methods for directing a mobile-communication device to a preferred teleconference bridge. The flow diagrams may be used by one of ordinary skill in the art to create software and/or hardware to carry out the various logical functions described and illustrated.

While various embodiments of the systems and methods for directing a mobile-communication device to a preferred teleconference bridge have been described, it will be apparent to those of ordinary skill in the art that many more embodiments and implementations are possible that are within the scope of the accompanying claims. Accordingly, the systems and methods for directing a mobile-communication device to a preferred teleconference bridge are not to be restricted beyond the attached claims and their equivalents.

What is claimed is:

1. A telecommunication system, comprising:
 a teleconference bridge;
 a first interface in communication with the teleconference bridge and a public-telephone network; and
 a second interface in communication with the teleconference bridge and a data network, the data network further coupled to a mobile-communication device, the second interface connecting a call from a mobile communication device to the teleconference bridge upon receipt of information responsive to a communicated license key entered during an application installation procedure on the mobile device.

2. The telecommunication system of claim 1, wherein the communicated license key is an encrypted representation of a pass code accepted on the teleconference bridge.

3. The telecommunication system of claim 1, wherein the communicated license key is entered once and stored thereafter in the mobile-communication device.

4. The telecommunication system of claim 1, wherein the teleconference bridge monitors the communication for a set of dual-tone multiple frequency (DTMF) encoded signals.

5. The telecommunication system of claim 4, wherein the set of dual-tone multiple frequency (DTMF) encoded signals identify the mobile-communication device.

6. The telecommunication system of claim 4, wherein the set of dual-tone multiple frequency (DTMF) encoded signals convey the information responsive to the communicated license key.

7. The telecommunication system of claim 1, wherein the second interface uses session initiated protocol.

8. The telecommunication system of claim 1, wherein the second interface receives information from the mobile-communication device via a short-range radio-frequency signal associated with a local area network.

9. The telecommunication system of claim 1, wherein the second interface receives information from the mobile-communication device via a cellular voice and data network.

10. A method for directing a mobile-communication device initiated call to a designated teleconference bridge, the method comprising:
    providing a telephone number associated with a teleconference bridge and a license key to a subscriber of a mobile-communication service, wherein the license key comprises an encrypted representation of a pass code that when decrypted and communicated from the mobile-communication device instructs the teleconference bridge to grant access to the operator of the mobile-communication device;
    providing executable instructions that upon initial execution on the mobile-communication device prompt an operator of the mobile-communication device to enter the license key and in response to the license key, decrypt and store the decrypted pass code on the mobile-communication device such that the pass code is available for communication to the designated teleconference bridge each time the operator of the mobile-communication device establishes a call via the telephone number; and
    upon receipt of a call from the mobile-communication device, waiting for the pass code before connecting the call to the teleconference bridge.

11. The method of claim 10, wherein the step of providing executable instructions further comprises:
    associating the pass code with teleconference bridge controls responsive to a subscriber privilege level.

12. The telecommunication system of claim 1, wherein the communicated license key includes a pass code accepted on the teleconference bridge.

13. The telecommunication system of claim 12, wherein the pass code identifies an operational mode for the mobile communication device for the conference call.

14. The telecommunication system of claim 12, wherein the pass code is a subset of alphanumeric characters from the communicated license key.

15. The telecommunication system of claim 12, wherein the pass code is a translated subset of alphanumeric characters from the communicated license key.

16. The telecommunication system of claim 1, wherein the pass code is generated from a portion of the alphanumeric characters from the communicated license key.

17. The telecommunication system of claim 1, wherein an authenticator, coupled to the teleconference bridge, prompts the mobile-communication device for a pass code.

18. The telecommunication system of claim 1, wherein an authenticator, coupled to the teleconference bridge, prompts the mobile-communication device for a pass code.

* * * * *